(12) United States Patent
Derouet et al.

(10) Patent No.: US 9,568,092 B2
(45) Date of Patent: Feb. 14, 2017

(54) DEVICE FOR DETECTING THE POSITIONS OF A CONTROL LEVER OF A GEARBOX IN TWO AXES OF ROTATION

(71) Applicant: Dura Automotive Systems SAS, Bievres (FR)

(72) Inventors: Hugues Derouet, Paris (FR); Dominique Beaufils, St-Fargeau-Ponthierry (FR)

(73) Assignee: DURA AUTOMOTIVE SYSTEMS SAS, Bievres (FR)

( * ) Notice: Subject to any disclaimer, the term of this patent is extended or adjusted under 35 U.S.C. 154(b) by 78 days.

(21) Appl. No.: 14/386,738

(22) PCT Filed: Mar. 20, 2013

(86) PCT No.: PCT/FR2013/050597
§ 371 (c)(1),
(2) Date: Sep. 19, 2014

(87) PCT Pub. No.: WO2013/140093
PCT Pub. Date: Sep. 26, 2013

(65) Prior Publication Data
US 2015/0048816 A1    Feb. 19, 2015

(30) Foreign Application Priority Data
Mar. 21, 2012    (FR) ...................................... 12 52530

(51) Int. Cl.
*G01B 7/30*    (2006.01)
*F16H 59/10*    (2006.01)
*F16H 59/02*    (2006.01)
*F16H 59/04*    (2006.01)
*G01B 7/00*    (2006.01)

(52) U.S. Cl.
CPC ........ *F16H 59/105* (2013.01); *F16H 59/0204* (2013.01); *F16H 59/044* (2013.01); *G01B 7/003* (2013.01); *B60Y 2400/3012* (2013.01)

(58) Field of Classification Search
CPC ................... B60Y 2400/3012; F16H 59/0204; F16H 59/044; F16H 59/105; G01B 7/003
USPC .......................... 324/207.2–207.25, 173–174
See application file for complete search history.

(56) References Cited

U.S. PATENT DOCUMENTS

| 4,488,455 A | 12/1984 | Shetler et al. |
| 6,867,680 B1 * | 3/2005 | Kulle ..................... H03K 17/97 338/12 |
| 7,721,618 B2 | 5/2010 | Takahashi et al. |

(Continued)

FOREIGN PATENT DOCUMENTS

| DE | 10 2009 015 883 A1 | 10/2010 |
| EP | 1 096 177 B1 | 5/2001 |

(Continued)

*Primary Examiner* — Jay Patidar
(74) *Attorney, Agent, or Firm* — Seed IP Law Group LLP

(57) ABSTRACT

A device is mounted with a capability for angular movement in a mounting unit, the movement being detected by an element that is able to send electrical signals within a processing unit. The element consist of a single 2D Hall-effect sensor able to measure the rotations of the magnetic field, the sensor being mounted in close proximity to a dual magnet to measure two rotations of the lever in two planes, each corresponding to the P, R, N, D and M+, M and M− positions.

3 Claims, 2 Drawing Sheets

(56) References Cited

U.S. PATENT DOCUMENTS

| | | | |
|---|---|---|---|
| 7,750,624 B2* | 7/2010 | Heo | F16H 59/0204 |
| | | | 324/207.23 |
| 8,072,209 B2 | 12/2011 | Jerance et al. | |
| 2004/0035237 A1* | 2/2004 | Matsui | F16H 59/105 |
| | | | 74/473.12 |
| 2006/0283276 A1* | 12/2006 | Komatsu | F16H 59/105 |
| | | | 74/335 |
| 2007/0040803 A1 | 2/2007 | Dider et al. | |
| 2007/0216402 A1 | 9/2007 | Blessing et al. | |
| 2008/0078604 A1* | 4/2008 | Ersoy | F16H 59/044 |
| | | | 180/336 |
| 2009/0048066 A1 | 2/2009 | Rouleau | |
| 2009/0120231 A1 | 5/2009 | Ruhlander et al. | |
| 2010/0282014 A1 | 11/2010 | Panizza et al. | |
| 2010/0289484 A1* | 11/2010 | Quinn | G01D 5/145 |
| | | | 324/207.2 |
| 2010/0294067 A1 | 11/2010 | Bak et al. | |
| 2011/0025308 A1 | 2/2011 | Kitanaka et al. | |
| 2012/0067154 A1 | 3/2012 | Rouleau | |
| 2013/0060436 A1 | 3/2013 | Cousins et al. | |
| 2013/0080001 A1 | 3/2013 | Cousins et al. | |
| 2013/0300403 A1 | 11/2013 | Benson et al. | |
| 2014/0256509 A1 | 9/2014 | Cousins et al. | |

FOREIGN PATENT DOCUMENTS

| | | |
|---|---|---|
| EP | 2 078 886 B1 | 7/2009 |
| EP | 2 112 406 A1 | 10/2009 |
| EP | 1 989 505 B1 | 5/2015 |
| FR | 2 930 309 B1 | 10/2009 |
| FR | 2 956 177 A1 | 8/2011 |

* cited by examiner

DEVICE FOR DETECTING THE POSITIONS OF A CONTROL LEVER OF A GEARBOX IN TWO AXES OF ROTATION

BACKGROUND

Technical Field

The invention concerns a device for the detection of the position of a control lever of a gearbox of an automotive vehicle.

More particularly, the invention concerns the detection of the P, R, N, D positions and the M+, M and M− positions of the control lever, notably, of a robotized gearbox generally servocontrolled by a processing unit.

Description of the Related Art

Generally, and in a perfectly known manner, the lever is mounted with a capability for angular movement in a mounting unit that is generally located within the vehicle's passenger compartment. The lever is designed to commands for the selection of the P, R, N and D positions around a rotation axis, and the engagement of speeds around another rotation axis for the M+ and M− positions.

Therefore, it is important to be able to detect the position of the lever, so as to ascertain its movements and its precise position in space.

One solution is addressed in patent EP 09 305 268, of which the applicant for the patent herein is also the holder.

This patent addresses a device for the detection of the position of the control lever, with the aim of detecting the movements of the said lever and sending electrical signals within a processing unit.

For this purpose, the device employs a 3D-type Hall-effect sensor to indicate the various movements and positions of the lever in the 3 X, Y and Z axes of the sensors, which are mounted in close proximity to a magnet.

This solution is satisfactory, but requires a dimension of positioning of the 3D sensor with a low tolerance, so as to enable one to precisely ascertain the P, R, N, D and M+ and the M and M− positions.

BRIEF SUMMARY

Working from this state of the art, the problem that the invention is designed to resolve is to simplify the detection of the P, R, N, D positions and the M+, M and M− positions of a control lever by augmenting certain tolerances.

To resolve such a problem, a device has been designed for the detection of the P, R, N, D and the M+, M and M− positions of a control lever of a gearbox of an automotive vehicle, mounted with a capability for angular movement in a mounting unit, with the said movement being detected by means able to send electrical signals within a processing unit.

According to the invention, given the problem posed, the means consist of a single 2D Hall-effect sensor that is able to measure just the rotation of the magnetic field, with the said sensor being mounted in close proximity to a dual magnet, to measure two rotations of the lever in two planes, each corresponding to the said P, R, N, D and the M+, M and M− positions.

The result of these arrangements is that, in each plane, the sensor perceives an angular rotation as if there was just one single magnet, with the change from one plane to another taking place with the sideways movement of the dual magnet, which causes a 180° rotation of the electrical fields.

To resolve the problem of detecting a rotation and a lateral movement of the magnet, the sensor is mounted on a fixed part of the mounting unit, whereas the magnet is mounted in a housing in an articulation rotary joint on the lever.

Working from this basic design, the dual magnet is either of North-South-North type, or of South-North-South type.

BRIEF DESCRIPTION OF THE SEVERAL VIEWS OF THE DRAWINGS

The invention is explained below in greater detail, with reference to the appended drawings, in which.

DETAILED DESCRIPTION

Figure 1:
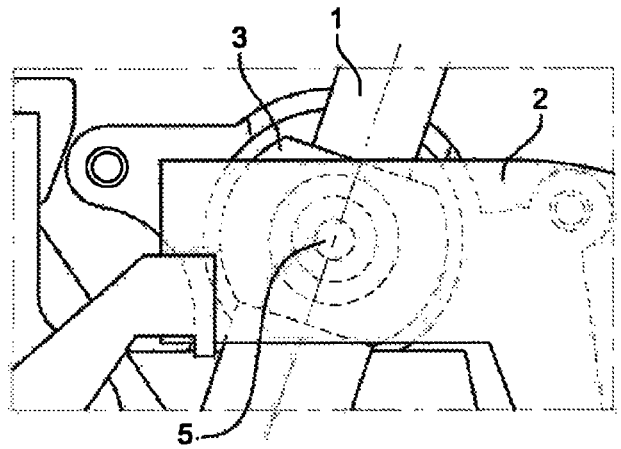
FIG. 1 is a purely-schematic view showing the mounting of the magnet on the lever, and its positioning in relation to the 2D Hall-effect sensor, with this lever being illustrated in the D position.
Figure 2:
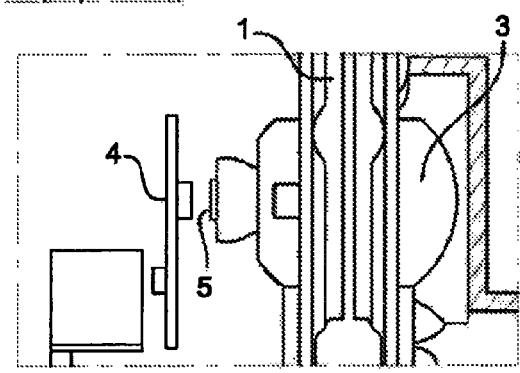
FIG. 2 is a side view corresponding to FIG. 1.
Figure 3:
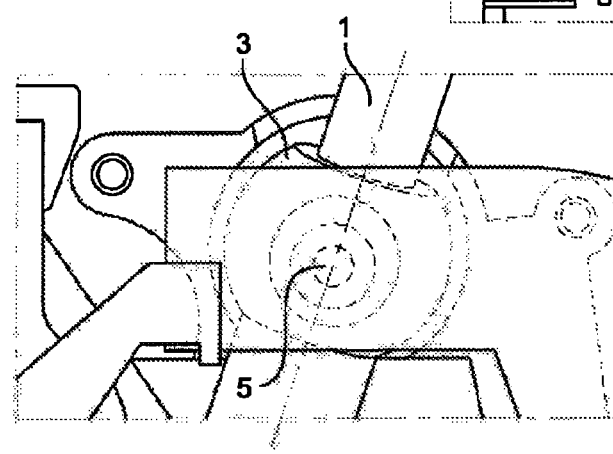
FIG. 3 is a view similar to FIG. 1, with the lever being illustrated in the M position.
Figure 4:
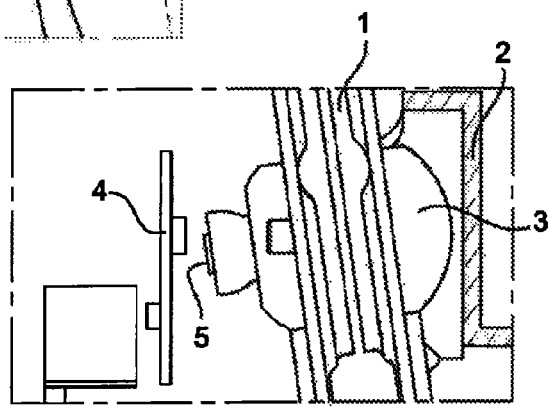
FIG. 4 is a side view corresponding to FIG. 3.

You are reminded that the targeted goal is to detect the P, R, N and D positions of a gear lever (1) (automatic operation) and the M+, M, M− positions of the said lever (1) (sequential operation). In a perfectly-known manner, the lever (1) is mounted with a capability for angular movement in a mounting unit (2) by means, for example, of a device of rotary joint type (3).

The lever (1) is designed to be coupled to any type of actuator for control over selection and engagement of gears.

The various positions and the various movements of the lever are detected in order to send electrical signals within a processing unit.

According to the invention, the means designed to send electrical signals within the processing unit consist of a single 2D Hall-effect sensor (4) able to only measure the rotations of the magnetic field.

This 2D sensor is mounted in close proximity to a dual magnet (5), to measure two lever rotations (1) in two planes, each corresponding to the P, R, N, D and the M+, M and M− positions.

The 2D Hall-effect sensor is, for example, of Melexis 90 316 type, whereas the dual magnet (5) can be of North-South-North type or South-North-South type.

The 2D sensor (4) is mounted on a fixed part of the mounting unit (2), whereas the dual magnet (5) is mounted in a housing on the articulation rotary joint (3).

The goal sought is to be able to detect a rotation and a lateral movement of the magnet in relation to the sensor.

Figure 5:
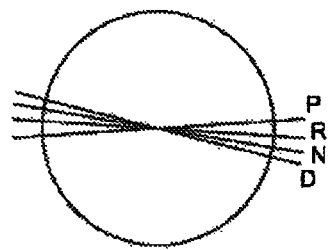
FIG. 5 is purely-schematic view showing the rotation of the lever around a Y axis corresponding to the P, R, N, D positions.
Figure 6:
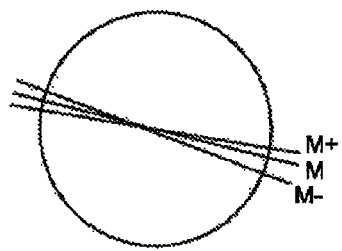
FIG. 6 is a purely-schematic view showing the rotation of the lever around an axis in a YZ plane corresponding to the M+, M and M− positions.

You are reminded that the P, R, N, D positions of the lever are around one rotation axis—for instance, around the Y axis (see FIG. 5), whereas the M+, M and M− positions of the lever are around another rotation axis—for example, in a YZ plane (see FIG. 6)—resulting from a tipping of the lever around the axis.

In each plane, the 2D Hall-effect sensor detects an angular rotation as if there was only one magnet.

Each rotation is limited to less than 150°. The change from one plane to another takes place with the sideways movement of the dual magnet, which causes a 180° rotation of the magnetic fields.

Figure 7:
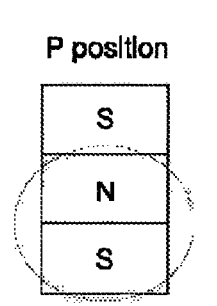
FIGS. 7, 8 and 9 are schematic views showing the rotation of the magnet in relation to the sensor, as a function of the position of the lever, namely the P position to the D position in FIG. 7, the D position to the M position in FIG. 8, and the M+ and M− positions in FIG. 9.
Figure 7:
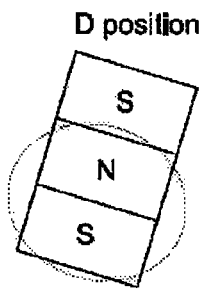
Figure 8:
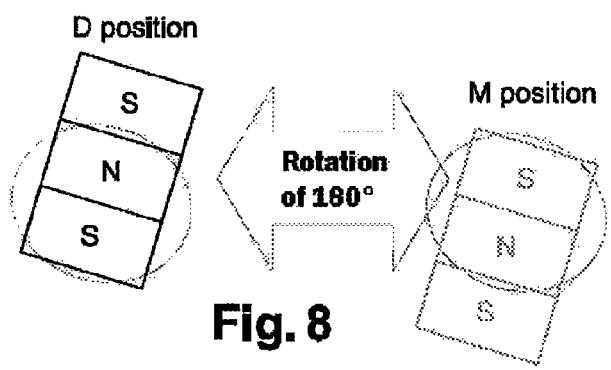
Figure 9:
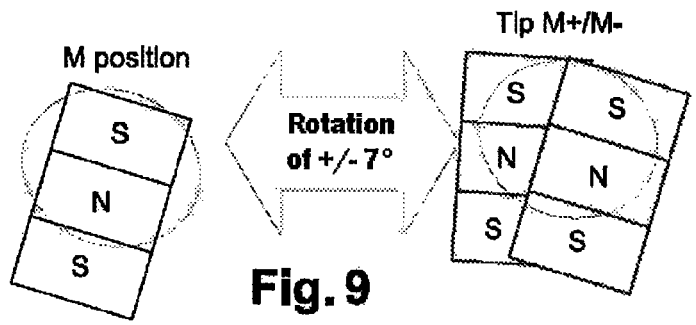

Refer to FIGS. 7, 8 and 9.

In FIG. 7, the rotation of the lever causes a rotation of the magnet. The sensor measures a rotation of the magnet.

In FIG. 8, when the lever changes from D to M by rotation around the X axis, the magnet is moved sideways. However, because of the positioning of the dual magnet, the sensor measures a rotation of the magnetic field of around 180°.

In FIG. 9, the lever moves in a YZ axis. The magnet moves sideways, and mostly in rotation. The sensor D2 measures a rotation of the magnetic field.

For example, from the P position to the D position (see FIG. 7), there is a rotation of around 26° of the magnet, with the sensor perceiving the North and South poles. From the D position to the M position (see FIG. 8), there is—as shown—a rotation of 180° of the magnetic fields. In the D position, the sensor perceives the North and South poles, whereas in the M position, the sensor perceives the South and North poles. From the M position to the M+, M− position (see FIG. 9), the rotation of the magnetic fields is around more or less 7°, for example.

The result of these arrangements is that the use of a dual magnet enables the perception of two partial rotations, as with a sensor that only perceives a total rotation. One of the partial rotations detects the P, R, N, D positions, whereas the other partial rotation corresponds to the reversal of the ensemble, in order to create magnetic fields for the M+, M− positions.

The advantages come clearly to the fore in the description; in particular, we emphasize and restate:
- the use of a single 2D Hall-effect sensor, by virtue of the use of a dual magnet;
- the integration of the sensors and the magnet within a limited volume;
- good precision in rotation through the use of a 2D Hall-effect sensor in opposition to a 3D Hall-effect sensor.

Lastly, we emphasize and restate that the use of a 2D Hall-effect sensor requires a certain tolerance on two axes only, instead of three. Also note that one can choose lower-performing and, therefore, cheaper components, because one can eliminate the aging of the magnet, which is a dual magnet either of North-South-North type or South-North-South type.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device for detecting P, R, N, D, M+, M, and M− positions of a control lever of a gearbox, the device comprising:
   a body of the device mounted in a mounting unit, the mounting unit having a fixed portion and a movable portion, the control lever coupled to the movable portion, the movable portion having a capability for angular movements in a first axis and a second axis, the first axis corresponding to movement of the movable portion between the P, R, N, and D positions and the second axis corresponding to movement of the movable portion between the M+, M and M− positions;
   a magnet coupled to the movable portion of the mounting unit, the magnet having a north-south-north orientation or a south-north-south orientation; and
   a 2D Hall-effect sensor, the 2D Hall-effect sensor coupled to the fixed portion of the mounting unit in close proximity to the magnet, the 2D Hall-effect sensor integrated within a processing unit, the 2D Hall-effect sensor configured to measure rotations of a magnetic field, the rotations of the magnetic field corresponding to movement of the magnet in the first axis and the second axis;
   wherein the movable portion of the mounting unit includes an articulation rotary joint of the control lever, the articulation rotary joint having a housing, the magnet coupled to the housing.

2. The device of claim 1 wherein movement between the P and D positions corresponds to angular rotation of the control lever of 26 degrees in the first axis.

3. The device of claim 1 wherein movement between the M+, and M positions corresponds to angular rotation of the control lever of 7 degrees in the second axis and movement between the M and M− positions corresponds to angular rotation of the control lever of 7 degrees in the second axis.

* * * * *